United States Patent
Gelfand et al.

(10) Patent No.: US 9,077,923 B2
(45) Date of Patent: Jul. 7, 2015

(54) CORRELATED DOUBLE SAMPLING DEVICE AND IMAGE SENSOR

(71) Applicants: Vadim Gelfand, Hwaseong-Si (KR); Claudio Jakobson, Hwaseong-Si (KR); Dmitry Aizenshtat, Hwaseong-Si (KR)

(72) Inventors: Vadim Gelfand, Hwaseong-Si (KR); Claudio Jakobson, Hwaseong-Si (KR); Dmitry Aizenshtat, Hwaseong-Si (KR)

(73) Assignee: Samsung Electronics Co., Ltd., Suwon-si, Gyeonggi-do (KR)

( * ) Notice: Subject to any disclaimer, the term of this patent is extended or adjusted under 35 U.S.C. 154(b) by 325 days.

(21) Appl. No.: 13/778,548

(22) Filed: Feb. 27, 2013

(65) Prior Publication Data

US 2014/0239153 A1    Aug. 28, 2014

(51) Int. Cl.
*H04N 5/335* (2011.01)
*H04N 5/378* (2011.01)
*H04N 5/357* (2011.01)

(52) U.S. Cl.
CPC ............. *H04N 5/378* (2013.01); *H04N 5/3575* (2013.01)

(58) Field of Classification Search
CPC .............................. H04N 5/3575; H04N 5/378
See application file for complete search history.

(56) References Cited

U.S. PATENT DOCUMENTS

| 8,743,258 | B2 * | 6/2014 | Park et al. ...................... 348/308 |
| 2005/0057675 | A1 | 3/2005 | Lee et al. |
| 2010/0171853 | A1 | 7/2010 | Kondo |
| 2013/0182164 | A1 * | 7/2013 | Duggal et al. ................. 348/302 |
| 2013/0270420 | A1 * | 10/2013 | Park et al. .................. 250/208.1 |
| 2015/0062395 | A1 * | 3/2015 | Ono et al. ...................... 348/301 |

FOREIGN PATENT DOCUMENTS

| JP | 2010-161484 | 7/2010 |
| KR | 532504 | 11/2005 |
| KR | 559451 | 3/2006 |
| KR | 913797 | 8/2009 |

* cited by examiner

*Primary Examiner* — Tony Ko
(74) *Attorney, Agent, or Firm* — Volentine & Whitt, PLLC

(57) ABSTRACT

A CDS device of an image sensor having a pixel array includes first comparators, second comparators and third comparators. The first comparators are coupled to columns of the pixel array, and generate a positive amplified signal and a negative amplified signal by comparing the analog signal and a ramp signal. The second comparators are coupled to a first set of the first comparators coupled to first columns of the pixel array, and generate a first comparison signal enabled to a first logic level by comparing the positive amplified signal and the negative amplified signal. The third comparators are coupled to a second set of the first comparators coupled to second columns of the pixel array, and generate a second comparison signal enabled to a second logic level by comparing the positive amplified signal and the negative amplified signal.

20 Claims, 8 Drawing Sheets

CORRELATED DOUBLE SAMPLING DEVICE AND IMAGE SENSOR

BACKGROUND

Example embodiments relate to image sensors, and more particularly, to correlated double sampling (CDS) devices and to image sensors including CDS devices.

Image sensors utilize an analog-digital converter to convert an analog signal generated from the detection of incident light into a digital signal. Generally, the analog-digital converter of the image sensor includes a correlated double sampling (CDS) device that compares the analog signal with a ramp signal. An analog-to-division conversion error can result if a slope of the ramp signal is not held constant and/or if one or more of a supply voltage, a ground voltage and a bias voltage are not held constant.

SUMMARY

Some example embodiments are directed to provide a correlated double sampling (CDS) device that reduces errors during an analog-digital conversion.

Some example embodiments are directed to provide an image sensor including the CDS device.

According to example embodiments, a correlated double sampling (CDS) device of an image sensor, which has a pixel array generating an analog signal corresponding to an incident light, includes a plurality of first comparators, a plurality of second comparators and a plurality of third comparators. The plurality of first comparators are coupled to columns of the pixel array, and each of the first comparators generates a positive amplified signal and a negative amplified signal by comparing the analog signal and a ramp signal. The plurality of second comparators are coupled to a first set of the first comparators that are coupled to first columns of the pixel array, and each of the second comparators generates a first comparison signal enabled to a first logic level by comparing the positive amplified signal and the negative amplified signal. The plurality of third comparators are coupled to a second set of the first comparators that are coupled to second columns of the pixel array, and each of the third comparators generates a second comparison signal enabled to a second logic level by comparing the positive amplified signal and the negative amplified signal.

In example embodiments, each of the second comparators may include a negative input electrode receiving the positive amplified signal and a positive input electrode receiving the negative amplified signal.

Each of the second comparators may generate the first comparison signal having the second logic level when the positive amplified signal is smaller than the negative amplified signal and generate the first comparison signal having the first logic level when the positive amplified signal is greater than the negative amplified signal.

In example embodiments, each of the third comparators may include a negative input electrode receiving the negative amplified signal and a positive input electrode receiving the positive amplified signal.

Each of the third comparators may generate the second comparison signal having the first logic level when the positive amplified signal is smaller than the negative amplified signal and generate the second comparison signal having the second logic level when the positive amplified signal is greater than the negative amplified signal.

In example embodiments, each of the first comparators may be a differential comparator including a negative input electrode receiving the ramp signal, a positive input electrode receiving the analog signal, a negative output electrode outputting the negative amplified signal and a positive output electrode outputting the positive amplified signal.

The CDS device may further include a plurality of first capacitors, each of which includes a first electrode coupled to a corresponding column of the pixel array and receiving the analog signal and a second electrode coupled to the positive input electrode of a corresponding first comparator, and a plurality of second capacitors, each of which includes a first electrode receiving the ramp signal and a second electrode coupled to the negative input electrode of a corresponding first comparator.

The CDS device may further include a plurality of first switches, each of which is coupled between the positive input electrode and the negative output electrode of a corresponding first comparator, and a plurality of second switches, each of which is coupled between the negative input electrode and the positive output electrode of a corresponding first comparator.

The first switches and the second switches may be closed during an auto-zero mode and the first switches and the second switches may be open during a normal operation mode.

In example embodiments, the first columns of the pixel array may correspond to odd number columns of the pixel array and the second columns of the pixel array may correspond to even number columns of the pixel array.

According to other example embodiments, an image sensor includes a pixel array, a correlated double sampling (CDS) device, and a counting unit. The pixel array includes a plurality of unit pixels arranged in rows and columns, and each of the unit pixels generates an analog signal corresponding to an incident light. The CDS device generates a comparison signal by comparing the analog signal and a ramp signal. The counting unit generates a digital signal by performing a count operation in synchronization with a count clock signal based on a logic level of the comparison signal. The CDS device includes a plurality of first comparators, a plurality of second comparators and a plurality of third comparators. The plurality of first comparators are coupled to columns of the pixel array, and each of the first comparators generates a positive amplified signal and a negative amplified signal by comparing the analog signal and the ramp signal. The plurality of second comparators are coupled to a first set of the first comparators that are coupled to first columns of the pixel array, and each of the second comparators generates a first comparison signal enabled to a first logic level by comparing the positive amplified signal and the negative amplified signal. The plurality of third comparators are coupled to a second set of the first comparators that are coupled to second columns of the pixel array, and each of the third comparators generates a second comparison signal enabled to a second logic level by comparing the positive amplified signal and the negative amplified signal.

In example embodiments, each of the second comparators may include a negative input electrode receiving the positive amplified signal and a positive input electrode receiving the negative amplified signal, generate the first comparison signal having the second logic level when the positive amplified signal is smaller than the negative amplified signal and generate the first comparison signal having the first logic level when the positive amplified signal is greater than the negative amplified signal.

In example embodiments, each of the third comparators may include a negative input electrode receiving the negative amplified signal and a positive input electrode receiving the positive amplified signal, generate the second comparison signal having the first logic level when the positive amplified signal is smaller than the negative amplified signal and generate the second comparison signal having the second logic level when the positive amplified signal is greater than the negative amplified signal.

In example embodiments, the counting unit may include a plurality of first count circuits and a plurality of second count circuits. The plurality of first count circuits may be coupled to the second comparators, and each of the first count circuits may generate the digital signal by counting a number of transitions of the count clock signal while the first comparison signal is in the second logic level. The plurality of second count circuits may be coupled to the third comparators, and each of the second count circuits may generate the digital signal by counting a number of transitions of the count clock signal while the second comparison signal is in the first logic level.

In example embodiments, the image sensor may further include a ramp signal generation unit that generates the ramp signal and provides the ramp signal to the CDS device.

According to other example embodiments, an image sensor may include a pixel array, a ramp signal generator, a correlated double sampling (CDS) device, and a counting unit. The pixel array may include a pixel array including a plurality of unit pixels arranged in rows and columns, each of the unit pixels generating an analog signal corresponding to an incident light, where the columns include a first set of columns and a second set of columns. The ramp signal generator may generate a ramp signal. The CDS device may be coupled to the columns of the pixel array, and may be configured to compare the analog signal of each column and the ramp signal to generate a positive amplified signal and a negative amplified signal for each column, to compare the positive amplified signal and the negative amplified signal of each of the first set of columns to generate a first comparison signal enabled to a first logic level for each of the first set of columns, and to compare the positive amplified signal and the negative amplified signal of each of the second set of columns to generate a second comparison signal enabled to a second logic level for each of the second set of columns. The counting unit may receive the first comparison signals and the second comparison signals from the CDS device, and may be configured to generate digital signals for the respective columns by performing a count operation in synchronization with a count clock signal based on a logic level of the first comparison signals and the second comparison signals.

In example embodiments, the CDS device may include two comparator circuits connected in series to each column of the pixel array, and the CDS device may further include a first switch connected between a positive input electrode and a negative output electrode of a first comparator circuit among the two comparator circuits, and a second switch connected between a negative input electrode and a positive output electrode of the first comparator.

In example embodiments, the image sensor may further include a row driver driving rows of the pixel array to generate the analog signal on each column of the pixel array, a column driver receiving the digital signals from the counting unit, and outputting the digital signals, and a timing controller controlling the row driver, the ramp circuit, the CDS, the counting unit and the column driver.

In example embodiments, the first set of columns may be even numbered columns of the pixel array, and the second set of columns may be odd numbered columns of the pixel array.

BRIEF DESCRIPTION OF THE DRAWINGS

Illustrative, non-limiting example embodiments will be more clearly understood from the detailed description that follows in conjunction with the accompanying drawings.

DETAILED DESCRIPTION OF THE EMBODIMENTS

Figure 1:
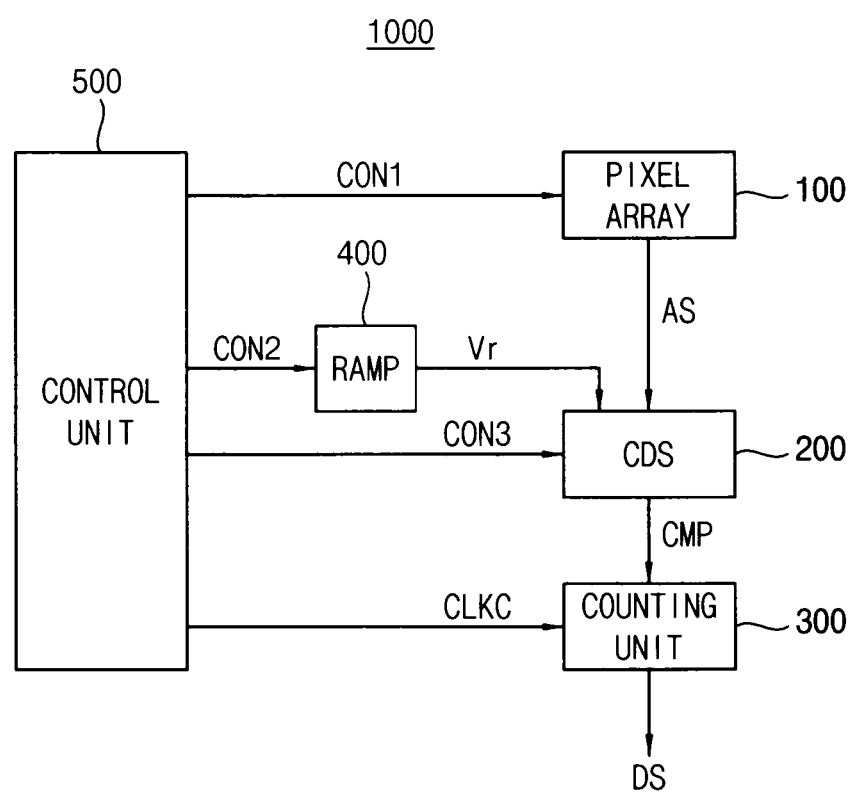
FIG. 1 is a block diagram illustrating an image sensor according to example embodiments.

Various example embodiments will be described more fully with reference to the accompanying drawings, in which some example embodiments are shown. The present inventive concept may, however, be embodied in many different forms and should not be construed as limited to the embodiments set forth herein. Rather, these embodiments are provided so that this disclosure will be thorough and complete, and will fully convey the scope of the present inventive concept to those skilled in the art. Like reference numerals refer to like elements throughout this application.

It will be understood that, although the terms first, second, etc. may be used herein to describe various elements, these elements should not be limited by these terms. These terms are used to distinguish one element from another. For example, a first element could be termed a second element, and, similarly, a second element could be termed a first element, without departing from the scope of the present inventive concept. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (e.g., "between" versus "directly between," "adjacent" versus "directly adjacent," etc.).

The terminology used herein is for the purpose of describing particular embodiments and is not intended to be limiting of the inventive concept. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

FIG. 1 is a block diagram illustrating an image sensor according to example embodiments.

Referring to FIG. 1, an image sensor 1000 includes a pixel array 100, a correlated double sampling (CDS) device 200, a counting unit 300, a ramp signal generation unit 400 and a control unit 500.

The pixel array 100 generates an analog signal AS corresponding to an incident light. For example, the pixel array 100 may include a plurality of unit pixels arranged in rows and columns, and each of the unit pixels may detect an incident light and generate the analog signal AS corresponding to the detected incident light.

The ramp signal generation unit 400 generates a ramp signal Vr which linearly changes in value, i.e., which changes in a constant rate to define a slope of the ramp signal Vr.

The CDS device 200 and the counting unit 300 operate as an analog-digital converter to generate a digital signal DS by digitalizing the analog signal AS.

The CDS device 200 generates a comparison signal CMP by comparing the analog signal AS received from the pixel array 100 and the ramp signal Vr received from the ramp signal generation unit 400. As will be explained in more detail later, the CDS device 200 may be configured to compare the analog signal AS of each column of the pixel array and the ramp signal to generate a positive amplified signal and a negative amplified signal for each column, to compare the positive amplified signal and the negative amplified signal of each of a first set of columns among the columns to generate a first comparison signal enabled to a first logic level for each of the first set of columns, and to compare the positive amplified signal and the negative amplified signal of each of a second set of columns among the columns to generate a second comparison signal enabled to a second logic level for each of the second set of columns.

The counting unit 300 generates the digital signal DS by performing a count operation in synchronization with a count clock signal CLKC based on a logic level of the comparison signal CMP. For example, the counting unit 300 may generate the digital signal DS by counting a number of transitions of the count clock signal CLKC while the comparison signal CMP is in a predetermined logic level.

The control unit 500 controls the pixel array 100 using a first control signal CON1, controls the ramp signal generation unit 400 using a second control signal CON2, and controls the CDS device 200 using a third control signal CON3. The control unit 500 provides the count clock signal CLKC to the counting unit 300.

Figure 2:
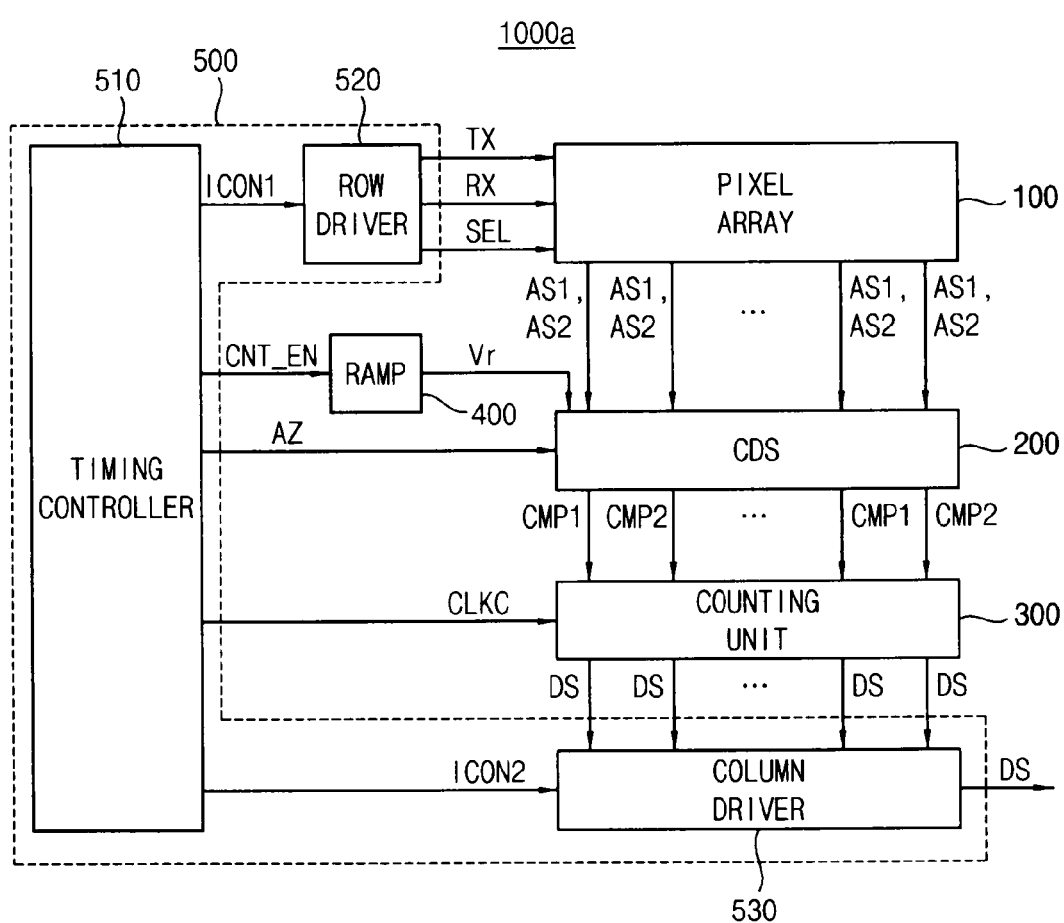
FIG. 2 is a block diagram illustrating in a more detailed example the image sensor of FIG. 1.

FIG. 2 is a block diagram illustrating a more detailed example of the image sensor of FIG. 1.

Referring to FIG. 2, an image sensor 1000a includes a pixel array 100, a correlated double sampling (CDS) device 200, a counting unit 300, a ramp signal generation unit 400 and a control unit 500. The control unit 500 of this example includes a timing controller 510, a row driver 520 and a column driver 530.

The timing controller 510 may provide a first inner control signal ICON1 to the row driver 520, and the row driver 520 may control an operation of the pixel array 100 in a unit of a row based on the first inner control signal ICON1. For example, the row driver 520 may control the operation of the pixel array 100 in a unit of a row by providing a row selection signal SEL, a reset control signal RX and a transmission control signal TX to the pixel array 100.

Each of the unit pixels included in the pixel array 100 may consecutively generate a first analog signal AS1 corresponding to a reset component and a second analog signal AS2 corresponding to the detected incident light in response to the row selection SEL, the reset control signal RX and the transmission control signal TX received from the row driver 520.

Figure 3:
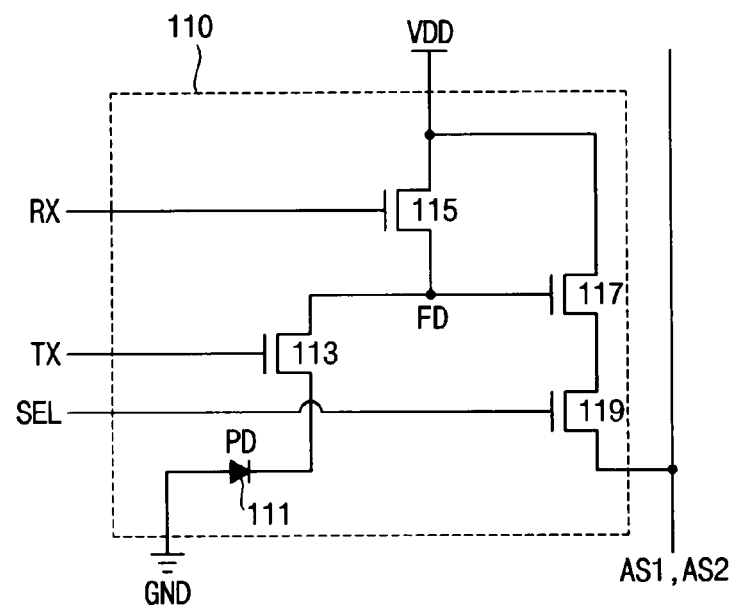
FIG. 3 is a circuit diagram illustrating an example of a unit pixel included in a pixel array of FIG. 2.

FIG. 3 is a circuit diagram illustrating an example of a unit pixel included in a pixel array of FIG. 2.

Referring to FIG. 3, a unit pixel 110 of this example includes a photo diode PD 111, a transmission transistor 113, a reset transistor 115, a sensing transistor 117 and a row selection transistor 119.

Hereinafter, an operation of the pixel array 100 will be described with reference to FIGS. 2 and 3.

The row driver 520 may select one of rows included in the pixel array 100 by providing an activated row selection signal SEL to the selected row of the pixel array 100 to turn on the row selection transistor 119. The row driver 520 may provide an activated reset control signal RX to the selected row to turn on the reset transistor 115. Therefore, a voltage of a node FD may be a supply voltage VDD, so that the sensing transistor 117 may be turned on to output the first analog signal AS1 corresponding to the voltage of the node FD.

After that, the row driver 520 may deactivate the reset control signal RX. When light is incident on the photo diode 111, the photo diode 111 may generate electron-hole pairs (EHPs). The generated EHPs may be accumulated at a source node of the transmission transistor 113 so that a potential of the source node of the transmission transistor 113 may be changed. The row driver 520 may provide an activated transmission control signal TX to the transmission transistor 113 to turn on the transmission transistor 113, and then the accumulated EHPs may be transferred to the node FD. The voltage of the node FD, which is a voltage of a gate of the sensing transistor 117, may be changed in response to the number of EHPs transferred to the node FD. If the row selection transistor 119 is turned on, the second analog signal AS2 corresponding to the voltage of the node FD may be outputted from the unit pixel 110.

After that, the row driver 520 may activate the reset control signal RX again to turn on the reset transistor 115 so that the voltage of the node FD may be the supply voltage VDD.

The pixel array 100 may repeat above described operations to generate the first analog signal AS1 and the second analog signal AS2 on a row by row basis.

The first analog signal AS1 and the second analog signal AS2 outputted from each unit pixel of the pixel array 100 have variations in a reset component due to respective characteristics of each unit pixel referred to as a fixed pattern noise (FPN) and respective characteristics of each logic circuit for outputting a voltage signal from a corresponding unit pixel. Accordingly, an effective intensity of incident light is extracted by subtracting the respective reset component from the detected intensity of incident light.

For this reason, each unit pixel included in the pixel array 100 may generate the first analog signal AS1 corresponding to a respective reset component, and detect the intensity of incident light to generate the second analog signal AS2 corresponding to a respective detected intensity of incident light. Then, the CDS device 200 and the counting unit 300 may generate the digital signal DS corresponding to an effective intensity of incident light among the detected incident light by performing a correlated double sampling (CDS) operation on the first analog signal AS1 and the second analog signal AS2. In this application, a CDS operation represents extracting a difference between two analog signals.

Referring again to FIG. 2, the timing controller 510 may control the operation of the ramp signal generation unit 400 by providing a count enable signal CNT_EN to the ramp signal generation unit 400.

The ramp signal generation unit 400 may generate the ramp signal Vr that decreases at the constant rate during an active period. The active period may be a time period during which the count enable signal CNT_EN is enabled.

Figure 4:
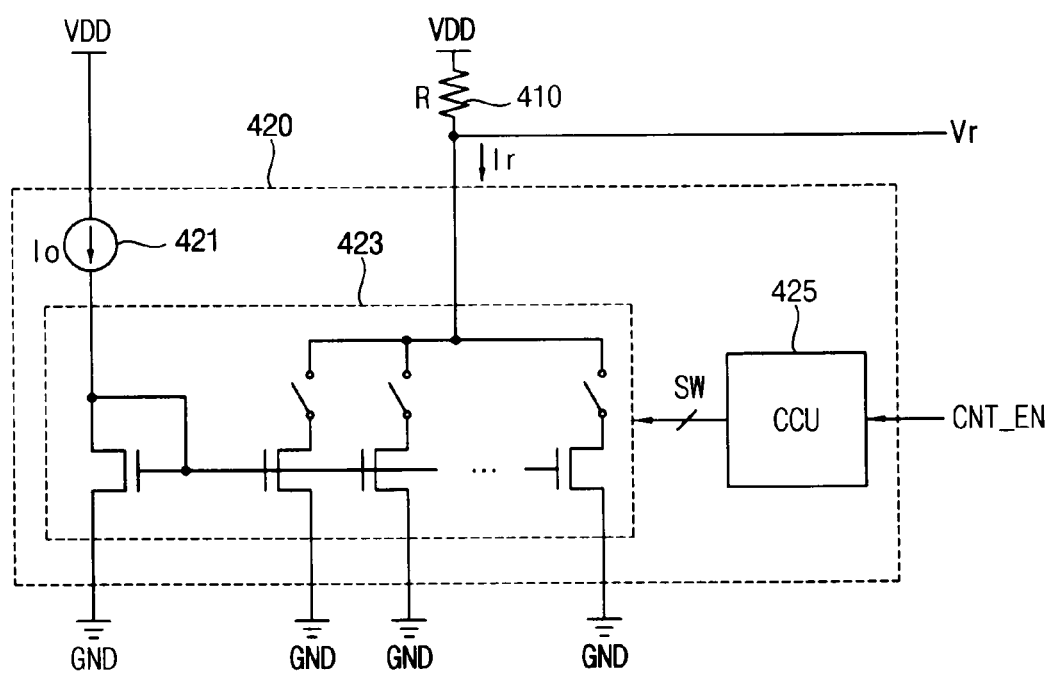
FIG. 4 is a block diagram illustrating an example of a ramp signal generation unit of FIG. 2.

FIG. 4 is a block diagram illustrating an example of a ramp signal generation unit of FIG. 2.

Referring to FIG. 4, a ramp signal generation unit 400a may include a resistor R 410 and a current generation unit 420.

The resistor 410 may be coupled between the supply voltage VDD and the current generation unit 420.

The current generation unit 420 may be coupled between the resistor 410 and a ground voltage GND. The current generation unit 420 may receive the count enable signal CNT_EN from the control unit 500. The current generation unit 420 may generate a reference current Ir that increases at a constant rate during the active period, in which the count enable signal CNT_EN is enabled. The reference current Ir may flow from the resistor 410 to the ground voltage GND.

The current generation unit 420 may include a static current source 421, a current amplification unit 423 and a current control unit CCU 425.

The static current source 421 may generate a static current Io having a constant magnitude.

The current control unit 425 may generate the amplification control signal SW in response to the count enable signal CNT_EN.

The current amplification unit 423 may amplify the static current Io to generate the reference current Ir in response to the amplification control signal SW received from the current control unit 425. As illustrated in FIG. 4, the current amplification unit 423 may include a plurality of current mirrors each of which has an n-type metal oxide semiconductor (NMOS) and a switch connected in serial. Each switch included in each of the current mirrors may be controlled by the amplification control signal SW so that a magnitude of the reference current Ir may be adjusted.

The ramp signal generation unit 400a may output the ramp signal Vr from a node at which the resistor 410 and the current generation unit 420 is coupled. The ramp signal Vr having a maximum value may be generated when all switches included in the current mirrors are opened. The ramp signal Vr may be decreased at a constant rate by closing the switches consecutively one by one.

The ramp signal generation unit 400a illustrated in FIG. 4 is one of examples, and embodiments are not limited thereto. The ramp signal generation unit 400 of FIG. 2 may be embodied in various ways.

Referring again to FIG. 2, the timing controller 510 may provide an auto-zero signal AZ to the CDS device 200, and the CDS device 200 may generate a first comparison signal CMP1 and a second comparison signal CMP2 by comparing the analog signals AS1 and AS2 received from the pixel array 100 with the ramp signal Vr received from the ramp signal generation unit 400.

Figure 5:
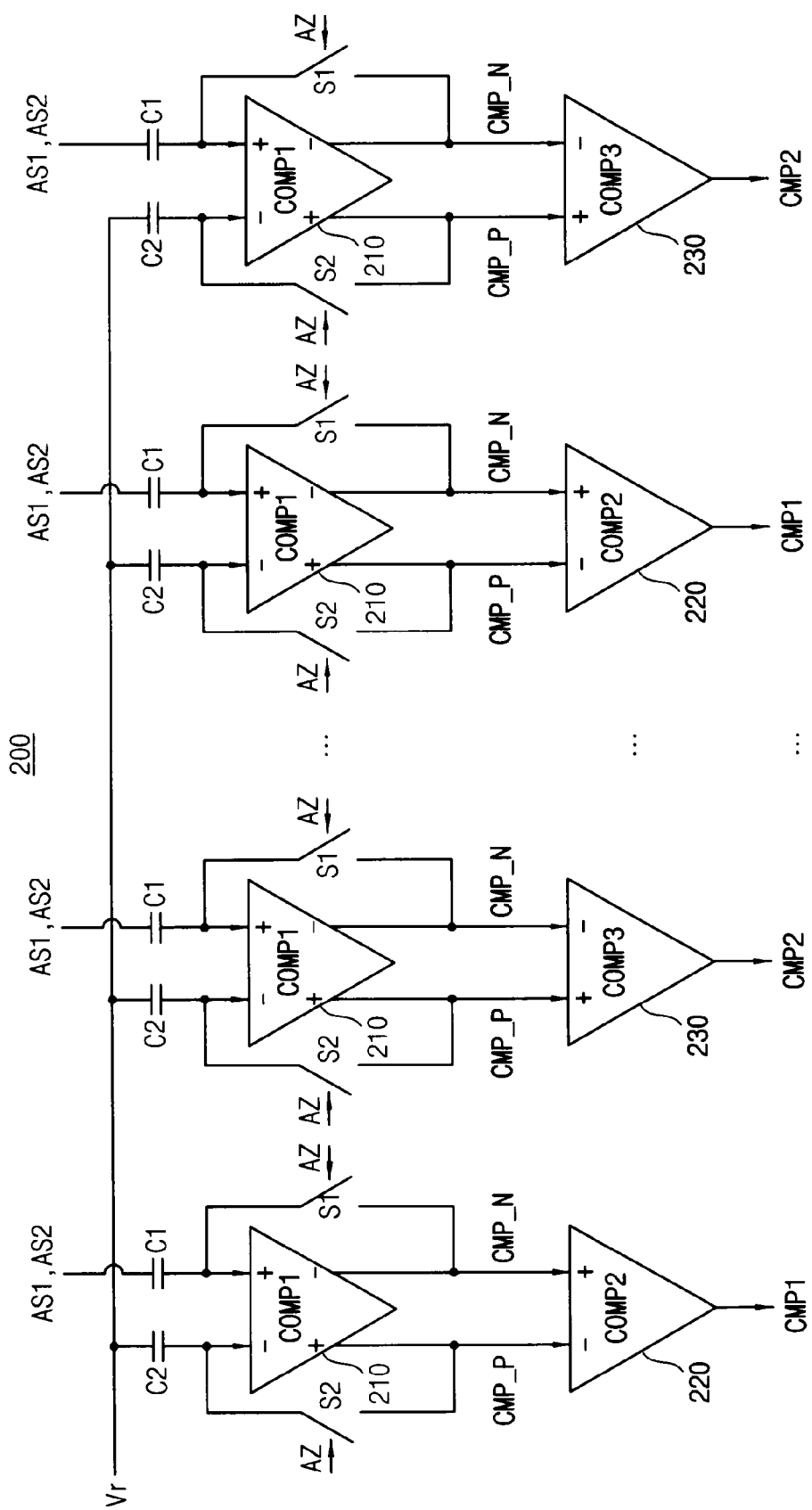
FIG. 5 is a block diagram illustrating an example of a CDS device of FIG. 2.

FIG. 5 is a block diagram illustrating an example of a CDS device of FIG. 2.

Referring to FIG. 5, the CDS device 200 may include a plurality of first comparators COMP1 210, a plurality of second comparators COMP2 220 and a plurality of third comparators COMP3 230.

Each of the first comparators 210 may be coupled to a corresponding column of the pixel array 100 and generate a positive amplified signal CMP_P and a negative amplified signal CMP_N by comparing the analog signals AS1 and AS2 and the ramp signal Vr.

In some example embodiments, each of the first comparators 210 may be a differential comparator including a negative input electrode receiving the ramp signal Vr, a positive input electrode receiving the analog signals AS1 and AS2, a negative output electrode outputting the negative amplified signal CMP_N and a positive output electrode outputting the positive amplified signal CMP_P.

Figure 6:
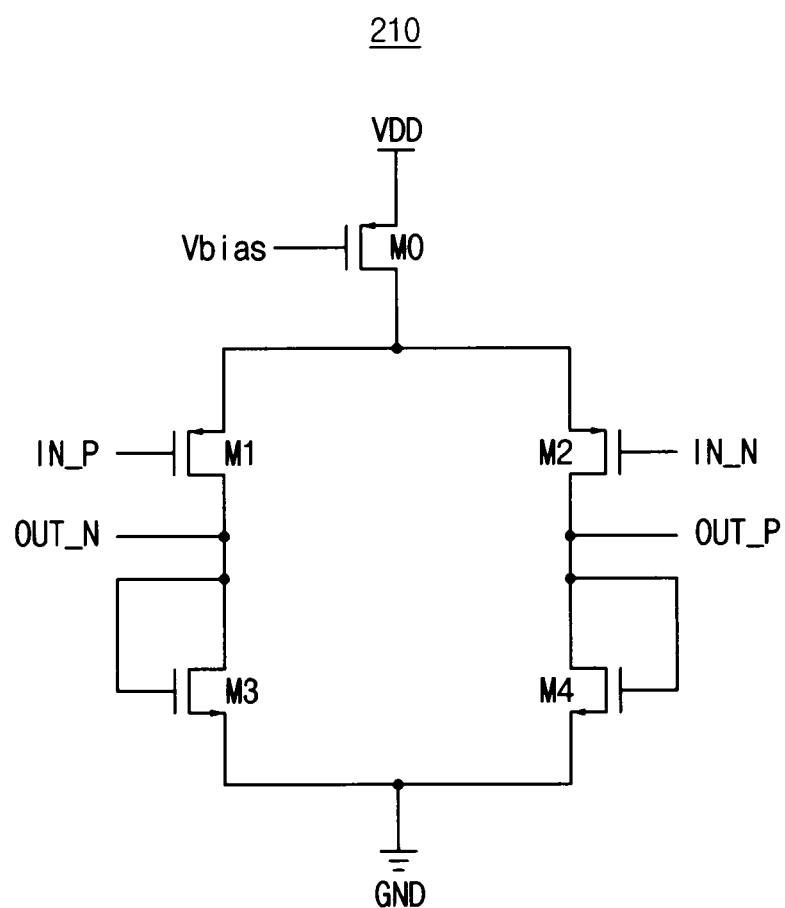
FIG. 6 is a circuit diagram illustrating an example of a first comparator included in the CDS device of FIG. 5.

FIG. 6 is a circuit diagram illustrating an example of a first comparator included in the CDS device of FIG. 5.

Referring to FIG. 6, a first comparator 210 may include first through fifth transistors M0, M1, M2, M3 and M4.

The first comparator 210 may be coupled between the supply voltage VDD and the ground voltage GND. The first comparator 210 may receive the analog signals AS1 and AS2 and the ramp signal Vr as differential inputs through the positive input electrode IN_P and the negative input electrode IN_N, respectively, and output the positive amplified signal CMP_P and the negative amplified signal CMP_N through the positive output electrode OUT_P and the negative output electrode OUT_N, respectively, by amplifying a difference between the analog signals AS1 and AS2 and the ramp signal Vr. Magnitudes of the positive amplified signal CMP_P and the negative amplified signal CMP_N may be adjusted based on a bias voltage Vbias.

Referring again to FIG. 5, the CDS device 200 may further include a plurality of first capacitors C1 and a plurality of second capacitors C2.

Each of the first capacitors C1 may include a first electrode coupled to a corresponding column of the pixel array 100 and receiving the analog signals AS1 and AS2 and a second electrode coupled to the positive input electrode of a corresponding first comparator 210. Therefore, each of the first capacitors C1 may store the first analog signal AS1 and the second analog signal AS2 and provide the first analog signal AS1 and the second analog signal AS2 to the positive input electrode of a corresponding first comparator 210.

Each of the second capacitors C2 may include a first electrode receiving the ramp signal Vr and a second electrode coupled to the negative input electrode of a corresponding first comparator 210. Therefore, each of the second capacitors C2 may store the ramp signal Vr and provide the ramp signal Vr to the negative input electrode of a corresponding first comparator 210.

The CDS device 200 may further include a plurality of first switches S1 and a plurality of second switches S2.

Each of the first switches S1 may be coupled between the positive input electrode and the negative output electrode of a corresponding first comparator 210. Each of the second switches S2 may be coupled between the negative input electrode and the positive output electrode of a corresponding first comparator 210.

The first switches S1 and the second switches S2 may be controlled by the auto-zero signal AZ. For example, the first switches S1 and the second switches S2 may be closed when the auto-zero signal AZ is in a logic high level, and the first switches S1 and the second switches S2 may be open when the auto-zero signal AZ is in a logic low level.

As will be described later, the first comparators 210 may operate in an auto-zero mode to eliminate offsets that might be occurred by the first comparators 210 while the auto-zero signal AZ is in a logic high level and the first switches S1 and the second switches S2 are closed. The first comparators 210 may operate in a normal operation mode to generate the positive amplified signal CMP_P and the negative amplified signal CMP_N by comparing the analog signals AS1 and AS2 with the ramp signal Vr while the auto-zero signal AZ is in a logic low level and the first switches S1 and the second switches S2 are open.

Each of the second comparators 220 may be coupled to a first set of the first comparators 210 that are coupled to first columns of the pixel array 100, and each of the third comparators 230 may be coupled to a second set of the first comparators 210 that are coupled to second columns of the pixel array 100. As described in FIG. 5, the first columns of the pixel array 100 may correspond to odd columns of the pixel array 100 and the second columns of the pixel array 100 may correspond to even columns of the pixel array 100. Therefore, the second comparators 220 and the third comparators 230 may be arranged alternatively.

Each of the second comparators 220 may receive the positive amplified signal CMP_P through a negative input electrode, receive the negative amplified signal CMP_N through a positive input electrode, and generate the first comparison signal CMP1 enabled to a first logic level by comparing the positive amplified signal CMP_P and the negative amplified signal CMP_N.

In some example embodiments, each of the second comparators 220 may output the first comparison signal CMP1 disabled to a second logic level when the positive amplified signal CMP_P is smaller than the negative amplified signal CMP_N, and output the first comparison signal CMP1 enabled to the first logic level when the positive amplified signal CMP_P is greater than the negative amplified signal CMP_N.

Each of the third comparators 230 may receive the positive amplified signal CMP_P through a positive input electrode, receive the negative amplified signal CMP_N through a negative input electrode, and generate the second comparison signal CMP2 enabled to the second logic level by comparing the positive amplified signal CMP_P and the negative amplified signal CMP_N.

In some example embodiments, each of the third comparators 230 may output the second comparison signal CMP2 disabled to the first logic level when the positive amplified signal CMP_P is smaller than the negative amplified signal CMP_N, and output the second comparison signal CMP2 enabled to the second logic level when the positive amplified signal CMP_P is greater than the negative amplified signal CMP_N.

Therefore, when the pixel array 100 provides the first analog signal AS1, each of the first comparators 210 may amplify a difference between the first analog signal AS1 and the ramp signal Vr, and each of the second comparators 220 may output the first comparison signal CMP1 disabled to the second logic level when the first analog signal AS1 is smaller than the ramp signal Vr and output the first comparison signal CMP1 enabled to the first logic level when the first analog AS1 is greater than the ramp signal Vr. When the pixel array 100 provides the second analog signal AS2, each of the first comparators 210 may amplify a difference between the second analog signal AS2 and the ramp signal Vr, and each of the second comparators 220 may output the first comparison signal CMP1 disabled to the second logic level when the second analog signal AS2 is smaller than the ramp signal Vr and output the first comparison signal CMP1 enabled to the first logic level when the second analog AS2 is greater than the ramp signal Vr.

Similarly, when the pixel array 100 provides the first analog signal AS1, each of the first comparators 210 may amplify a difference between the first analog signal AS1 and the ramp signal Vr, and each of the third comparators 230 may output the second comparison signal CMP2 disabled to the first logic level when the first analog signal AS1 is smaller than the ramp signal Vr and output the second comparison signal CMP2 enabled to the second logic level when the first analog AS1 is greater than the ramp signal Vr. When the pixel array 100 provides the second analog signal AS2, each of the first comparators 210 may amplify a difference between the second analog signal AS2 and the ramp signal Vr, and each of the third comparators 230 may output the second comparison signal CMP2 disabled to the first logic level when the second analog signal AS2 is smaller than the ramp signal Vr and output the second comparison signal CMP2 enabled to the second logic level when the second analog AS2 is greater than the ramp signal Vr.

In some example embodiments, the first logic level may be a logic low level, and the second logic level may be a logic high level. In other example embodiments, the first logic level may be a logic high level, and the second logic level may be a logic low level.

The second comparators 220 and the third comparators 230 may have the same structure and operation except that input signals of the positive input electrode and the negative input electrode of the second comparators 220 are switched in the case of the third comparators 230.

As described above, the ramp signal Vr may decrease linearly from a maximum value at a constant rate. As the ramp signal Vr decreases, a transition of the first comparison signal CMP1 and a transition of the second comparison signal CMP2 may occur very close to one another in time. Therefore, if both the second comparators 220 and the third comparators 230 output a comparison signal transitioning from the first logic level to the second logic level as the ramp signal Vr decreases, coupling effects resulted from the transition of the comparison signal may be accumulated such that a slope of the ramp signal Vr is kept constant and/or one or more of the supply voltage VDD, the ground voltage GND and the bias voltage Vbias are not kept constant, which can introduce errors in the analog-digital conversion.

However, according to the CDS device 200, as the ramp signal Vr decreases, the second comparator 220 generates the first comparison signal CMP1 transitioning from the second logic level to the first logic level, and the third comparator 230 generates the second comparison signal CMP2 transitioning from the first logic level to the second logic level. Therefore, positive coupling effects and negative coupling effects may be canceled such that a slope of the ramp signal Vr is effectively kept constant and the supply voltage VDD, the ground voltage GND and the bias voltage Vbias are effectively kept constant. As such, the CDS device 200 may reduce analog-digital conversion errors.

Figure 7:
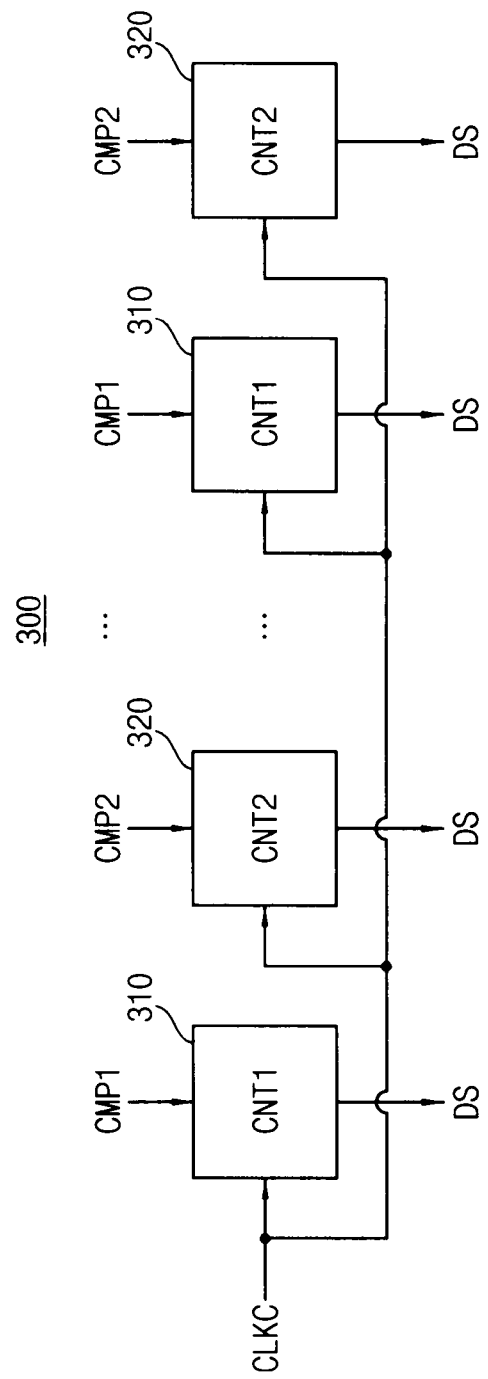
FIG. 7 is a block diagram illustrating an example of a counting unit of FIG. 2.

FIG. 7 is a block diagram illustrating an example of a counting unit of FIG. 2.

Referring to FIG. 7, the counting unit 300 may include a plurality of first count circuits CNT1 310 and a plurality of second count circuits CNT2 320.

Each of the first count circuits 310 may be coupled to the second comparators 220. Each of the first count circuits 310 may receive the first comparison signal CMP1 from a corresponding second comparator 220 and receive the count clock signal CLKC from the timing controller 510. Each of the first count circuits 310 may generate the digital signal DS by performing a count operation in synchronization with the count clock signal CLKC while the first comparison signal CMP1 is in the second logic level. For example, each of the first count circuits 310 may generate the digital signal DS by counting a number of transitions of the count clock signal CLKC while the first comparison signal CMP1 is in the second logic level.

In some example embodiments, when the pixel array 100 provides the first analog signal AS1, each of the first count circuits 310 may generate a first count value by counting a number of transitions of the count clock signal CLKC while the first comparison signal CMP1 is in the second logic level. When the pixel array 100 provides the second analog signal AS2, each of the first count circuits 310 may generate a second count value by counting a number of transitions of the count clock signal CLKC while the first comparison signal CMP1 is in the second logic level. Each of the first count circuits 310 may generate the digital signal DS by subtracting the first count value from the second count value.

Each of the second count circuits 320 may be coupled to the third comparators 230. Each of the second count circuits 320 may receive the second comparison signal CMP2 from a corresponding third comparator 230 and receive the count clock signal CLKC from the timing controller 510. Each of the second count circuits 320 may generate the digital signal DS by performing a count operation in synchronization with the count clock signal CLKC while the second comparison signal CMP2 is in the first logic level. For example, each of the second count circuits 320 may generate the digital signal DS by counting a number of transitions of the count clock signal CLKC while the second comparison signal CMP2 is in the first logic level.

In some example embodiments, when the pixel array 100 provides the first analog signal AS1, each of the second count circuits 320 may generate a first count value by counting a number of transitions of the count clock signal CLKC while the second comparison signal CMP2 is in the first logic level. When the pixel array 100 provides the second analog signal AS2, each of the second count circuits 320 may generate a second count value by counting a number of transitions of the count clock signal CLKC while the second comparison signal CMP2 is in the first logic level. Each of the second count circuits 320 may generate the digital signal DS by subtracting the first count value from the second count value.

The count clock signal CLKC may be toggled only during the active period in which the count enable signal CNT_EN is enabled.

Referring again to FIG. 2, the column driver 530 may consecutively output the digital signals DS corresponding to a row of the pixel array 100 received from the counting unit 300 based on a second inner control signal ICON2 received from the timing controller 510. Although not illustrated in FIG. 2, the column driver 530 may provide the digital signals DS to a digital signal processor.

Figure 8:
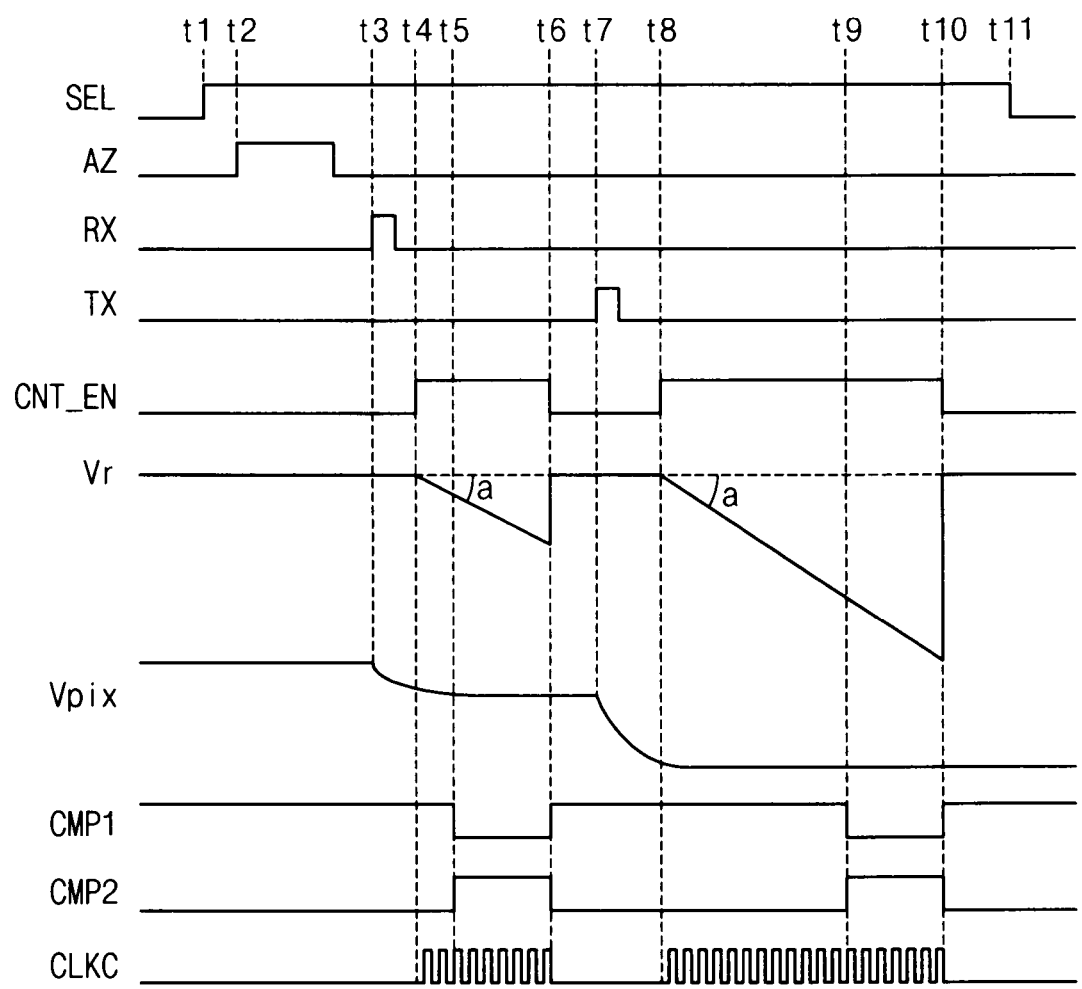
FIG. 8 is a timing diagram for describing an operation of an image sensor of FIG. 2.

FIG. 8 is a timing diagram for describing an operation of an image sensor of FIG. 2.

Hereinafter, an operation of the image sensor 1000a of FIG. 2 will be described with reference to FIGS. 1 to 8.

At a time t1, the row driver 520 may select one of rows included in the pixel array 100 by providing an activated row selection signal SEL to the selected row of the pixel array 100.

At a time t2, the timing controller 510 may provide the auto-zero signal AZ enabled to the logic high level to the CDS device 200, and the first switches S1 and the second switches S2 included in the CDS device 200 may be closed. Therefore, a feedback path may be formed in the first comparators 210 so that the first comparators 210 operate in the auto-zero mode to store offsets of the first comparators 210.

After that, the timing controller 510 may provide the auto-zero signal AZ disabled to the logic low level to the CDS device 200, and the first switches S1 and the second switches S2 included in the CDS device 200 may be open. Therefore, the offsets that might be occurred by the first comparators 210 may be effectively eliminated.

At a time t3, the row driver 520 may provide an activated reset control signal RX to the selected row. From the time t3, the pixel array 100 may output the first analog signal AS1 corresponding to a reset component as the pixel voltage Vpix.

At a time t4, the timing controller 510 may provide the count enable signal CNT_EN having a logic high level to the ramp signal generation unit 400, and the ramp signal generation unit 400 may start to decrease the ramp signal Vr in the constant rate, that is a slop of 'a'. In addition, the timing controller 510 may provide the count clock signal CLKC to the first count circuits 310 and the second count circuits 320 included in the counting unit 300. At this time, since the ramp signal Vr is greater than the pixel voltage Vpix corresponding to the first analog signal AS1, the second comparators 220 may provide the first comparison signal CMP1 disabled to the logic high level to the first count circuits 310, and the third comparators 230 may provide the second comparison signal CMP2 disabled to the logic low level to the second count circuits 320. Therefore, the first count circuits 310 and the second count circuits 320 may start to perform a count operation in synchronization with the count clock signal CLKC.

At a time t5, a magnitude of the ramp signal Vr may become smaller than a magnitude of the pixel voltage Vpix. Therefore, the second comparators 220 may provide the first comparison signal CMP1 having a logic low level to the first count circuits 310 so that the first count circuits 310 stops performing the count operation and generates the first count value. The third comparators 230 may provide the second comparison signal CMP2 having a logic high level to the second count circuits 320 so that the second count circuits 320 stops performing the count operation and generates the first count value.

At a time t6, the timing controller 510 may provide the count enable signal CNT_EN having a logic low level to the ramp signal generation unit 400, and the ramp signal generation unit 400 may stop generating the ramp signal Vr.

A period from the time t4 to the time t6 corresponds to a maximum time for counting the reset component. A length of the period from the time t4 to the time t6 may be determined as a certain number of the count clock signal CLKC according to a characteristic of the image sensor 1000a.

At a time t7, the row driver 520 may provide an activated transmission control signal TX to the selected row. From the time t7, the pixel array 100 may output the second analog signal AS2 corresponding to a detected incident light as the pixel voltage Vpix.

At a time t8, the timing controller 510 may provide the count enable signal CNT_EN having a logic high level to the ramp signal generation unit 400, and the ramp signal generation unit 400 may start to decrease the ramp signal Vr in the same constant rate as at the time t4, that is a slope of 'a'. In addition, the timing controller 510 may provide the count clock signal CLKC to the first count circuits 310 and the second count circuits 320 included in the counting unit 300. At this time, since the ramp signal Vr is greater than the pixel voltage Vpix corresponding to the second analog signal AS2, the second comparators 220 may provide the first comparison signal CMP1 disabled to the logic high level to the first count circuits 310, and the third comparators 230 may provide the second comparison signal CMP2 disabled to the logic low level to the second count circuits 320. Therefore, the first count circuits 310 and the second count circuits 320 may start to perform a count operation in synchronization with the count clock signal CLKC.

At a time t9, the magnitude of the ramp signal Vr may become smaller than the magnitude of the pixel voltage Vpix. Therefore, the second comparators 220 may provide the first comparison signal CMP1 having a logic low level to the first count circuits 310 so that the first count circuits 310 stops performing the count operation and generates the second count value. The third comparators 230 may provide the second comparison signal CMP2 having a logic high level to the second count circuits 320 so that the second count circuits 320 stops performing the count operation and generates the second count value. After that, the second comparators 220 and the third comparators 230 may generate the digital signal DS by subtracting the first count value from the second count value.

At a time t10, the timing controller 510 may provide the count enable signal CNT_EN having a logic low level to the ramp signal generation unit 400, and the ramp signal generation unit 400 may stop generating the ramp signal Vr.

A period from the time t8 to the time t10 corresponds to a maximum time for counting the detected incident light. A length of the period from the time t8 to the time t10 may be determined as a certain number of the count clock signal CLKC according to a characteristic of the image sensor 1000a.

At a time t11, the row driver 520 may provide a deactivated row selection signal SEL to the selected row of the pixel array 100, and the first count circuits 310 and the second count circuits 320 may reset the first count value and the second count value.

The image sensor 1000a may repeat the above described operations with respect to each row to generate the digital signals DS on a row by row basis.

As described above, since the image sensor 1000a performs an analog-digital conversion using the CDS device 200 that reduces variations of the supply voltage VDD, the ground voltage GND, the bias voltage Vbias and a slope of the ramp signal Vr, the image sensor 1000a may reduce analog-digital conversion errors. Therefore, the image sensor 1000a may provide image data of relatively high quality.

Figure 9:
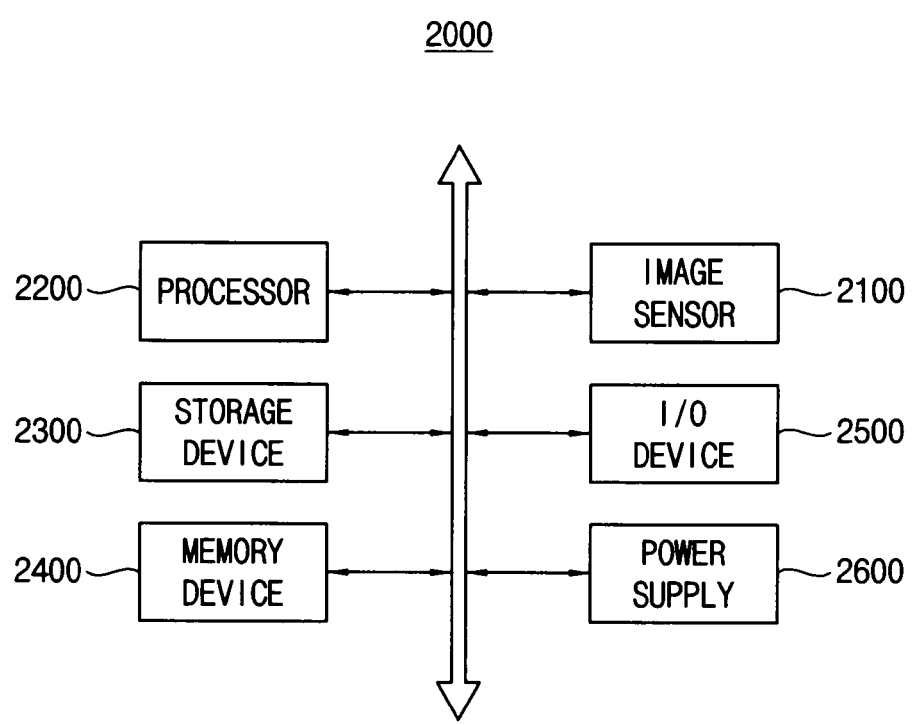
FIG. 9 is a block diagram illustrating an electronic apparatus according to example embodiments.

FIG. 9 is a block diagram illustrating an electronic apparatus according to example embodiments.

Referring to FIG. 9, an electronic apparatus 2000 includes an image sensor 2100, a processor 2200 and a storage device 2300.

The image sensor 2100 generates a digital signal corresponding to incident light. The storage device 2300 stores the digital signal generated by the image sensor 2100. The processor 2200 controls operations of the image sensor 2100 and the storage device 2300.

The electronic apparatus 2000 may further include a memory device 2400, an input/output device 2500 and a power supply 2600. Although not illustrated in FIG. 9, the electronic apparatus 2000 may further include ports to communicate with a video card, a sound card, a memory card, a universal serial bus (USB) device, and so on.

The processor 2200 may perform various computing functions, such as executing specific software for performing specific calculations or tasks. For example, the processor 2200 may be a microprocessor or a central process unit. The processor 2200 may be connected to the storage device 2300, the memory device 2400 and the input/output device 2500 via bus such as an address bus, a control bus or a data bus. The processor 2200 may be connected to an extended bus, such as peripheral component interconnect (PCI) bus.

The storage device 2300 may include a solid state drive, a flash memory device, a hard disk drive, a compact disk read-only memory (CD-ROM) drive, and so on.

The memory device 2400 may be a dynamic random access memory (DRAM), a static random access memory (SRAM), or a non-volatile memory, such as an erasable programmable read-only memory (EPROM), an electrically erasable programmable read-only memory (EEPROM), a flash memory, and so on.

The input/output device 2500 may include a keyboard, a mouse, a printer, a display device, etc. The power supply 2600 may supply operational power.

The image sensor 2100 communicates with the processor 2200 via a bus. The image sensor 2100 includes a pixel array, a correlated double sampling (CDS) device, a counting unit, a ramp signal generation unit and a control unit.

The pixel array generates an analog signal corresponding to an incident light. The ramp signal generation unit generates a ramp signal linearly changing at a constant rate. The CDS device generates a first comparison signal and a second comparison signal by comparing the analog signal received from the pixel array with the ramp signal received from the ramp signal generation unit. The counting unit generates the digital signal by performing a count operation in synchronization with a count clock signal based on a logic level of the first comparison signal and the second comparison signal.

The image sensor 2100 may be embodied as the image sensor 1000/1000a of FIGS. 1 and 2. A structure and an operation of the image sensor 1000 of FIG. 1 have been described above with reference to FIGS. 1 to 8, and accordingly, a detailed description of the image sensor 2100 of FIG. 9 is omitted here to avoid redundancy.

In some example embodiments, the image sensor 2100 may be integrated in a chip with the processor 2200. In other embodiments, the image sensor 2100 and the processor 2200 may be contained in separate chips. The electronic apparatus 2000 may be any of a variety of systems that include an image sensor. Examples of the electronic apparatus include a digital camera, a camcorder, a smart phone, a personal computer, a laptop computer, a personal digital assistant, and so on.

The foregoing is illustrative of the present inventive concept and is not to be construed as limiting thereof. Although a few example embodiments have been described, those skilled in the art will readily appreciate that many modifications are possible in the example embodiments without materially departing from the novel teachings and advantages of the present inventive concept. Accordingly, all such modifications are intended to be included within the scope of the present inventive concept as defined in the claims. Therefore, it is to be understood that the foregoing is illustrative of various example embodiments and is not to be construed as limited to the specific example embodiments disclosed, and that modifications to the disclosed example embodiments, as well as other example embodiments, are intended to be included within the scope of the appended claims.

What is claimed is:

1. A correlated double sampling (CDS) device of an image sensor that includes a pixel array generating an analog signal corresponding to an incident light, the CDS device comprising:

a plurality of first comparators coupled to columns of the pixel array, each of the first comparators generating a positive amplified signal and a negative amplified signal by comparing the analog signal and a ramp signal;

a plurality of second comparators coupled to a first set of the first comparators that are coupled to first columns of the pixel array, each of the second comparators generating a first comparison signal enabled to a first logic level by comparing the positive amplified signal and the negative amplified signal; and a plurality of third comparators coupled to a second set of the first comparators that are coupled to second columns of the pixel array, each of the third comparators generating a second comparison signal enabled to a second logic level by comparing the positive amplified signal and the negative amplified signal.

2. The CDS device of claim 1, wherein each of the second comparators includes a negative input electrode receiving the positive amplified signal and a positive input electrode receiving the negative amplified signal.

3. The CDS device of claim 2, wherein each of the second comparators generates the first comparison signal having the second logic level when the positive amplified signal is smaller than the negative amplified signal, and generates the first comparison signal having the first logic level when the positive amplified signal is greater than the negative amplified signal.

4. The CDS device of claim 1, wherein each of the third comparators includes a negative input electrode receiving the negative amplified signal and a positive input electrode receiving the positive amplified signal.

5. The CDS device of claim 4, wherein each of the third comparators generates the second comparison signal having the first logic level when the positive amplified signal is smaller than the negative amplified signal, and generates the second comparison signal having the second logic level when the positive amplified signal is greater than the negative amplified signal.

6. The CDS device of claim 1, wherein each of the first comparators is a differential comparator including a negative input electrode receiving the ramp signal, a positive input electrode receiving the analog signal, a negative output electrode outputting the negative amplified signal, and a positive output electrode outputting the positive amplified signal.

7. The CDS device of claim 6, further comprising:
a plurality of first capacitors, each of the first capacitors including a first electrode coupled to a corresponding column of the pixel array and receiving the analog signal and a second electrode coupled to the positive input electrode of a corresponding first comparator; and
a plurality of second capacitors, each of the second capacitors including a first electrode receiving the ramp signal and a second electrode coupled to the negative input electrode of a corresponding first comparator.

8. The CDS device of claim 6, further comprising:
a plurality of first switches, each of the first switches coupled between the positive input electrode and the negative output electrode of a corresponding first comparator; and
a plurality of second switches, each of the second switches coupled between the negative input electrode and the positive output electrode of a corresponding first comparator.

9. The CDS device of claim 8, wherein the first switches and the second switches are closed during an auto-zero mode, and the first switches and the second switches are open during a normal operation mode.

10. The CDS device of claim 1, wherein the first columns of the pixel array correspond to odd numbered columns of the pixel array and the second columns of the pixel array correspond to even numbered columns of the pixel array.

11. An image sensor, comprising:
a pixel array including a plurality of unit pixels arranged in rows and columns, each of the unit pixels generating an analog signal corresponding to an incident light;

a correlated double sampling (CDS) device configured to generate a comparison signal by comparing the analog signal and a ramp signal; and
a counting unit configured to generate a digital signal by performing a count operation in synchronization with a count clock signal based on a logic level of the comparison signal,
wherein the CDS device comprises:
a plurality of first comparators coupled to the columns of the pixel array, each of the first comparators generating a positive amplified signal and a negative amplified signal by comparing the analog signal and the ramp signal;
a plurality of second comparators coupled to a first set of the first comparators that are coupled to first columns of the pixel array, each of the second comparators generating a first comparison signal enabled to a first logic level by comparing the positive amplified signal and the negative amplified signal; and
a plurality of third comparators coupled to a second set of the first comparators that are coupled to second columns of the pixel array, each of the third comparators generating a second comparison signal enabled to a second logic level by comparing the positive amplified signal and the negative amplified signal.

12. The image sensor of claim 11, wherein each of the second comparators includes a negative input electrode receiving the positive amplified signal and a positive input electrode receiving the negative amplified signal, generates the first comparison signal having the second logic level when the positive amplified signal is smaller than the negative amplified signal, and generates the first comparison signal having the first logic level when the positive amplified signal is greater than the negative amplified signal.

13. The image sensor of claim 11, wherein each of the third comparators includes a negative input electrode receiving the negative amplified signal and a positive input electrode receiving the positive amplified signal, generates the second comparison signal having the first logic level when the positive amplified signal is smaller than the negative amplified signal, and generates the second comparison signal having the second logic level when the positive amplified signal is greater than the negative amplified signal.

14. The image sensor of claim 11, wherein the counting unit comprises:
a plurality of first count circuits coupled to the second comparators, each of the first count circuits generating the digital signal by counting a number of transitions of the count clock signal while the first comparison signal is in the second logic level; and
a plurality of second count circuits coupled to the third comparators, each of the second count circuits generating the digital signal by counting a number of transitions of the count clock signal while the second comparison signal is in the first logic level.

15. The image sensor of claim 11, further comprising:
a ramp signal generation unit configured to generate the ramp signal and to provide the ramp signal to the CDS device.

16. An image sensor, comprising:
a pixel array including a plurality of unit pixels arranged in rows and columns, each of the unit pixels generating an analog signal corresponding to an incident light, wherein the columns include a first set of columns and a second set of columns;
a ramp signal generator generating a ramp signal;

a correlated double sampling (CDS) device coupled to the columns of the pixel array, the CDS device configured to compare the analog signal of each column and the ramp signal to generate a positive amplified signal and a negative amplified signal for each column, to compare the positive amplified signal and the negative amplified signal corresponding to each of the first set of columns to generate a first comparison signal enabled to a first logic level for each of the first set of columns, and to compare the positive amplified signal and the negative amplified signal corresponding to each of the second set of columns to generate a second comparison signal enabled to a second logic level for each of the second set of columns; and a counting unit which receives the first comparison signals and the second comparison signals from the CDS device, the counting unit configured to generate digital signals for the respective columns by performing a count operation in synchronization with a count clock signal based on a logic level of the first comparison signals and the second comparison signals.

17. The image sensor of claim 16, wherein the CDS device includes two comparator circuits connected in series to each column of the pixel array.

18. The image sensor of claim 17, wherein the CDS device further includes a first switch connected between a positive input electrode and a negative output electrode of a first comparator circuit among the two comparator circuits, and a second switch connected between a negative input electrode and a positive output electrode of the first comparator.

19. The image sensor of claim 16, further comprising:
a row driver driving rows of the pixel array to generate the analog signal on each column of the pixel array;
a column driver receiving the digital signals from the counting unit, and outputting the digital signals; and
a timing controller controlling the row driver, the ramp circuit, the CDS, the counting unit and the column driver.

20. The image sensor of claim 16, wherein the first set of columns are even numbered columns of the pixel array, and the second set of columns are odd numbered columns of the pixel array.

* * * * *